July 25, 1950 F. C. FANTZ 2,516,510
SWING VALVE
Filed Aug. 22, 1945
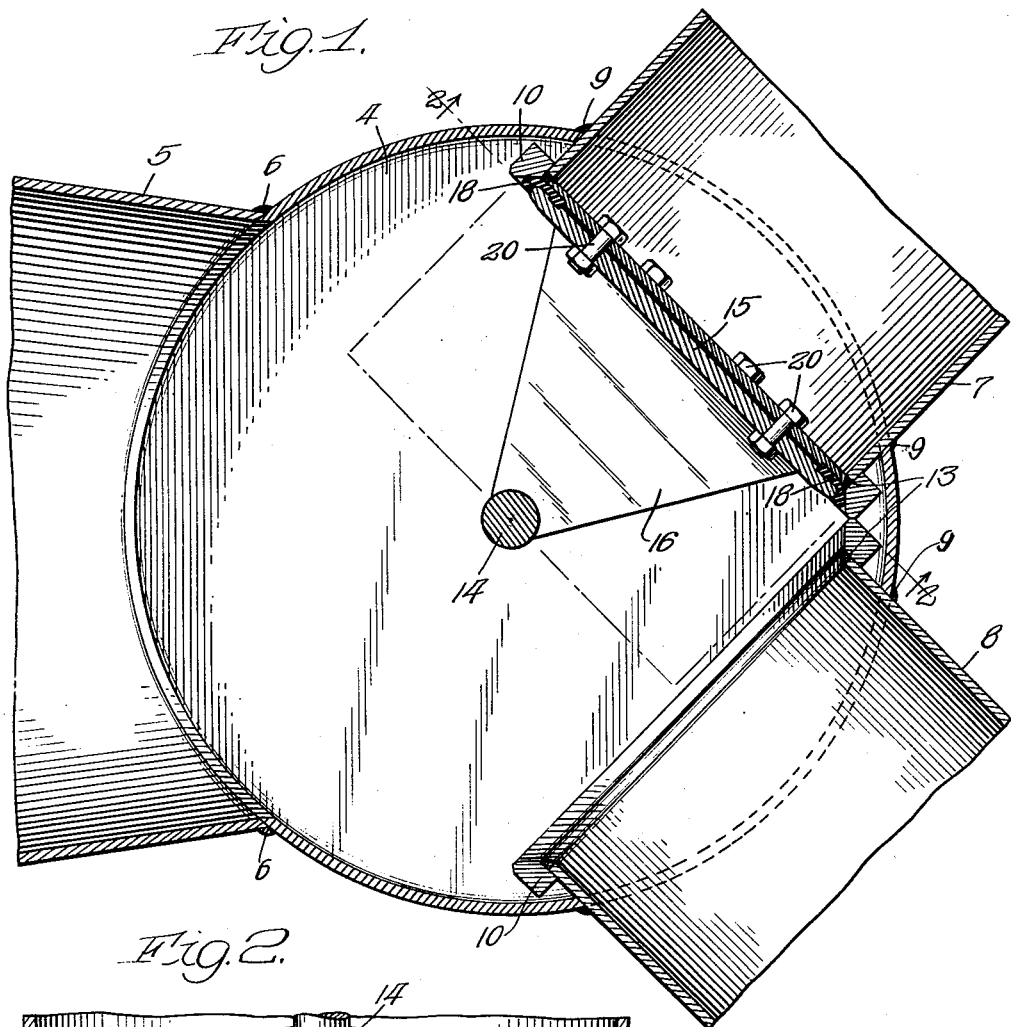
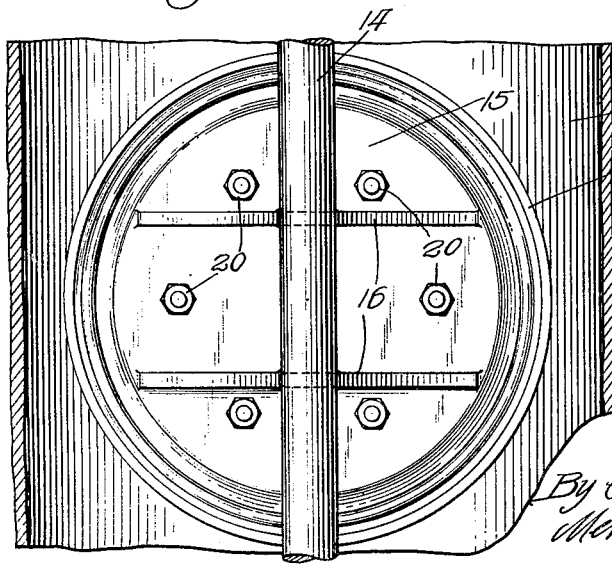
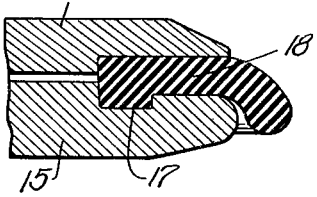
Inventor:
Fred C. Fantz, Patented July 25, 1950

2,516,510

UNITED STATES PATENT OFFICE 2,516,510

SWING VALVE

Fred C. Fantz, Logan Township, Auglaize County, Ohio, assignor to Henry Pratt Company, a corporation of Illinois Application August 22, 1945, Serial No. 611,972

5 Claims. (Cl. 251—13)

This invention relates to high pressure swing valves wherein a valve chamber having three or more openings is provided with a disc-like movable valve member, which may be turned to close one or the other of the openings.

The primary object of the invention is to provide an inexpensive valve which may be formed of welded parts and may easily be swung to a desired position without obstructing the flow of liquids through the open ports to any serious extent.

A further object of the invention is to provide an improved movable valve member and improved valve seats.

The invention is illustrated in a preferred embodiment in the accompanying drawings, in which:

Figure 1 is a fragmentary plan sectional view of a valve embodying the invention; Fig. 2, a vertical sectional view taken as indicated at line 2—2 of Fig. 1; and Fig. 3, a fragmentary enlarged sectional view, showing how the gasket is held by the movable valve member.

In the embodiment illustrated, a valve chamber 4 is preferably made of steel plate, or cast iron, and is provided with an inlet conduit 5 which is welded to the walls of the valve chamber, as indicated at 6. The end walls of the chamber may be in the usual form of circular metal plates (not shown). They may be welded or bolted in position.

A pair of outlet conduits 7 and 8 extend into the valve chamber through holes and are welded as indicated at 9. The inner end of the outlet conduits are each provided with an annular ring 10, of rust-proof material such as bronze or stainless steel, and the corner portions are filled with welding material of the same composition, as indicated at 13.

An operating shaft 14 is journalled in the end walls of the valve chamber and is provided with an inner disc-like plate 15, having ribs 16 which are welded to the operating shaft. It will be understood that the shaft may be provided, outside of the valve casing, with suitable gears, or an operating handle, not shown. Preferably, the plate 15 is provided with a groove 17, to receive a leg of an annular gasket 18 of rubber-like material. An outer plate 19 serves to grip the gasket, and is secured in position by a series of bolts 20.

Valve seats are ground in the rings 10, so as to be radial with respect to a central point on the axis of the shaft 14. Thus it will be understood that the movable valve member may be turned from the position shown in Fig. 1, to a position where it will open the conduit 7 and close the conduit 8. The gasket 18 assures a good tight connection which will prevent leakage. It will be seen that in either position of the movable valve member, liquids may flow from the inlet port to an outlet port with a minimum of resistance in the valve chamber.

Valves of this character may be made in large sizes, and a 35-inch valve chamber is ample to accommodate a 27-inch inlet conduit, and two 20-inch conduits. The valves are useful in waterworks where strainers are provided in the outlets and it is necessary to close the outlets while its strainer is being cleaned.

The foregoing detailed description is given for clearness of understanding only, and no unnecessary limitations should be understood therefrom, for some modifications will be obvious to those skilled in the art.

I claim:

1. A high pressure swing valve comprising, a valve chamber having end walls and a continuous side wall, said side wall having an inlet opening and a plurality of outlet openings, an operating shaft rotatably journaled in the end walls, an outlet conduit welded in each of said outlet openings and having a flat end extending around its perimeter inside of said side wall, a valve seat member on the inner end of each of said outlet conduits, each of said valve seat members having an annular valve seat, a flat disc-like valve member secured to said shaft at a fixed distance therefrom so that it may be turned by said shaft from one valve seat to another, all portions of each of said valve seats being approximately equidistant from a point at the intersection of the axes of the valve seats and the axis of rotation of said shaft.

2. Apparatus as claimed in claim 1, in which each of the valve seats is flared outwardly toward the pressure side and the movable valve member has a marginal rubber-like gasket fixed thereto to engage either of said flared valve seats, said gasket extending outwardly beyond the marginal edge of the valve member to be wiped across the radial valve seats and when in registry with one of them be pressed thereagainst by the pressure in the valve chamber.

3. A high pressure swing valve comprising, a valve chamber having end walls and a continuous side wall, said side wall having an inlet opening and a plurality of outlet openings, an operating shaft rotatably mounted in the chamber between the end walls, an outlet conduit fixed in each of the outlet openings and extending a distance into said chamber, an annular ring fixed to the inner end of each of said outlet conduits, an outwardly flaring annular valve seat formed in the inner face of each ring and lying in a plane parallel to the axis of rotation of the shaft, all portions of each of said valve seats being approximately equidistant from a point at the intersection of the axes of the valve seats and the axis of rotation of the shaft, a flat disc-like valve member secured to said shaft at a fixed distance therefrom to be turned thereby from one valve seat to another, a marginal rubber-like gasket fixed to said valve member to engage either of said flared valve seats, the gasket wiping edgewise over said valve seats when the valve member moves from one seat to another as the shaft is rotated.

4. Apparatus as claimed in claim 3, in which said gasket is of greater outside diameter than said valve member to provide an edge portion subject to the pressure within the chamber to press said gasket edge portion against the valve seats as it slides edgewise thereover and to seal the valve with one of the valve seats when in registry therewith with the valve member and valve seat free of metal to metal contact.

5. A high pressure swing valve comprising a valve chamber having an inlet opening and a plurality of circular outlet conduits with the axes of the conduits lying in a single plane, an operating shaft rotatably mounted in the chamber with the axis of rotation of the shaft being located at the intersection of the axes of the outlet conduits and lying in a plane perpendicular to a plane passing through the axes of the outlet conduits, an annular valve seat formed at the inner end of each outlet conduit with all of the valve seats being equidistant from the shaft, a flat disc-like valve member secured to said shaft at a fixed distance therefrom to be turned thereby from one valve seat to another, said valve member being parallel to the axis of rotation of the shaft and the valve member having a maximum diameter less than the diameter of the valve seats, and a marginal annular resilient gasket fixed to said valve member and extending outwardly beyond the outer edges of the valve member and adapted to engage either of the valve seats with rotation of the shaft.

FRED C. FANTZ.

REFERENCES CITED

The following references are of record in the file of this patent:

UNITED STATES PATENTS

| Number | Name | Date |
|---|---|---|
| 156,087 | Higgs | Oct. 20, 1874 |
| 1,166,571 | Bard | Jan. 4, 1916 |
| 1,744,798 | Price | Jan. 28, 1930 |
| 1,780,562 | Melling | Nov. 4, 1930 |
| 2,097,285 | Lundgren | Oct. 26, 1937 |

FOREIGN PATENTS

| Number | Country | Date |
|---|---|---|
| 245,650 | Great Britain | of 1926 |